United States Patent
Boddukuri et al.

(10) Patent No.: US 9,037,640 B2
(45) Date of Patent: May 19, 2015

(54) PROCESSING STREAMS MESSAGES OVER A SYSTEM AREA NETWORK

(75) Inventors: Vinod K. Boddukuri, Hyderabad (IN); Ramana R. Machireddy, Pune (IN); Abhishek Mishra, Hyderabad (IN); Sanket Rathi, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 13/458,742

(22) Filed: Apr. 27, 2012

(65) Prior Publication Data

US 2013/0191548 A1    Jul. 25, 2013

Related U.S. Application Data

(63) Continuation of application No. 13/354,216, filed on Jan. 19, 2012.

(51) Int. Cl.
*G06F 13/00* (2006.01)
*H04L 12/931* (2013.01)

(52) U.S. Cl.
CPC .............. *H04L 49/358* (2013.01); *G06F 13/00* (2013.01)

(58) Field of Classification Search
USPC ................................................ 709/231, 232
See application file for complete search history.

(56) References Cited

U.S. PATENT DOCUMENTS

| | | | |
|---|---|---|---|
| 6,920,635 B1 | 7/2005 | Lodrige et al. | |
| 6,990,528 B1* | 1/2006 | Neal et al. | 709/232 |
| 7,032,243 B2 | 4/2006 | Leerssen et al. | |
| 7,149,817 B2 | 12/2006 | Pettey | |
| 7,409,468 B2 | 8/2008 | Biran et al. | |
| 7,437,451 B2* | 10/2008 | Tang et al. | 709/224 |
| 7,486,689 B1* | 2/2009 | Mott | 370/412 |
| 7,689,710 B2 | 3/2010 | Tang et al. | |
| 7,908,372 B2 | 3/2011 | Huang et al. | |
| 2002/0167932 A1* | 11/2002 | McGowan | 370/349 |
| 2003/0084219 A1* | 5/2003 | Yao et al. | 710/300 |
| 2007/0014308 A1* | 1/2007 | Gunthorpe et al. | 370/466 |
| 2009/0198826 A1* | 8/2009 | Ishijima | 709/231 |

FOREIGN PATENT DOCUMENTS

CN           101409715 A  *  4/2009   ............... H04L 1/00

OTHER PUBLICATIONS

Paul Grun, Introduction to Infiniband for End Users, Infiniband Trade Association, pp. 1-52 https://cw.infinibandta.org/document/dl/7268.*

(Continued)

*Primary Examiner* — Jeffrey Nickerson
*Assistant Examiner* — Linh T Nguyen
(74) *Attorney, Agent, or Firm* — Yee & Associates, P.C.; Parashos Kalaitzis

(57) ABSTRACT

A computer implemented method processes STREAMS messages over an Infiniband system area network. STREAMS messages received at a STREAMS over Infiniband module from a STREAMS based application are encapsulated in Infiniband verbs to create an encapsulated STREAMS message. A STREAMS identifier header is appended onto the Infiniband verb. The STREAMS over Infiniband module forwards the encapsulated STREAMS message to a streams interface layer where the encapsulated STREAMS message is then forwarded to a host channel adapter of the Infiniband system area network.

10 Claims, 10 Drawing Sheets

(56) References Cited

OTHER PUBLICATIONS

RFC 4391—Transmission of IP over InfiniBand (IPoIB)—Request for Comments 4391, Chu et al., Apr. 2006, pp. 1-21.*

Craciunas et al., "I/O Resource Management through System Call Scheduling," ACM SIGOPS Operating Systems Review—Research and Developments in the Linux Kernel, 42(5):44-54, Jul. 2008.

Boddukun et al., "Processing Streams Messages over a System Area Network," U.S. Appl. No. 13/354,216, filed Jan. 19, 2012, 40 pages.

Non-final office action dated Oct. 25, 2013 regarding U.S. Appl. No. 13/354,216, 10 pages.

Non-final office action dated Sep. 13, 2013 regarding U.S. Appl. No. 13/354,216, 17 pages.

Notice of Allowance, dated Jul. 8, 2014, regarding U.S. Appl. No. 13/354,216, 11 pages.

* cited by examiner

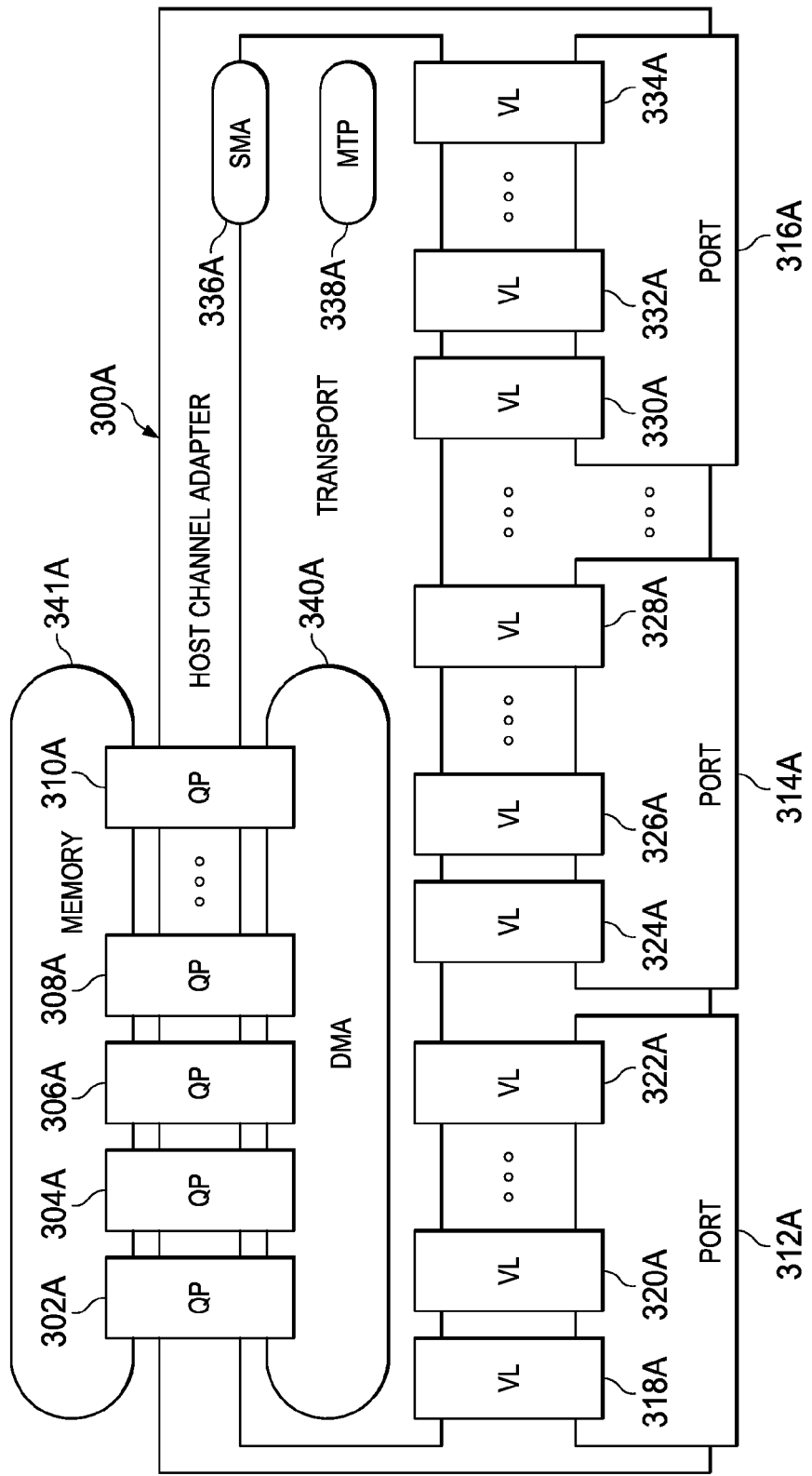

US 9,037,640 B2

PROCESSING STREAMS MESSAGES OVER A SYSTEM AREA NETWORK

This application is a continuation of application Ser. No. 13/354,216 filed Jan. 19, 2012, status pending.

BACKGROUND

1. Field

The disclosure relates generally to a computer implemented method, a data processing system, and a computer program product for sending data packets in a system area network. More specifically, the disclosure relates to a computer implemented method, a data processing system, and a computer program product for sending STREAMS data in an Infiniband network.

2. Description of the Related Art

In a system area network (SAN), such as an Infiniband (IB) network, the hardware provides a message passing mechanism that can be used for input/output devices (I/O) and interprocess communications (IPC) between general computing nodes. Processes executing on devices access SAN message passing hardware by posting send/receive messages to send/receive work queues on a SAN channel adapter (CA). These processes also are referred to as "consumers."

The send/receive work queues (WQ) are assigned to a consumer as a queue pair (QP). The messages can be sent over five different transport types: reliable connected (RC), reliable datagram (RD), unreliable connected (UC), unreliable datagram (UD), and raw datagram (RawD). Consumers retrieve the results of these messages from a completion queue (CQ) through SAN work completion (WC) queues. The source channel adapter takes care of segmenting outbound messages and sending them to the destination. The destination channel adapter takes care of reassembling inbound messages and placing them in the memory space designated by the destination's consumer.

Two channel adapter types are present in nodes of the SAN fabric: a host channel adapter (HCA) and a target channel adapter (TCA). The host channel adapter is used by general purpose computing nodes to access the SAN fabric. Consumers use SAN verbs to access host channel adapter functions. The software that interprets verbs and directly accesses the channel adapter is known as the channel interface (CI).

Target channel adapters (TCA) are used by nodes that are the subject of messages sent from host channel adapters. The target channel adapters serve a similar function as that of the host channel adapters in providing the target node an access point to the SAN fabric.

STREAMS is modular architecture for implementing full-duplex input/output between kernel or user space processes and device drivers for implementing character devices. Character devices are devices through which the system transmits data one character at a time. Character devices stream communication with devices, such as mice, keyboards, virtual terminals, and serial modems.

STREAMS defines standard interfaces for character input and output within the system kernel and between the kernel and the rest of the system. The associated mechanisms of the interfaces consists of a set of system calls, kernel resources, and kernel utility routines. The standard interface and open-ended mechanism enable modular, portable development, and easy integration of high-performance network services and components.

Using a combination of system calls, kernel routines, and kernel utilities, STREAMS passes data between a driver and the stream head in the form of messages. Messages that are passed from the stream head toward the driver are said to travel downstream while messages passed in the other direction travel upstream.

Software stacks used for communication over system area networks (SAN), such as an Infiniband (IB) network, do not directly support STREAMS based applications. Instead, a complex and inefficient data flow involving multiple intermediate layers is required to pass data from a STREAMS based application, over the Infiniband network, and finally to a device driver. A transport layer application interface that is independent of any transport provider, such as X/Open transport interface is first used to pass data from the STREAMS based applications through X/Open transport interface to a sockets layer. Using an upper layer networking protocol having access to the Infiniband stack, such as sockets direct protocol (SDP) data can then be passed from the sockets layer to Infiniband stack verbs. Only then can the Infiniband communication manager send STREAMS data from the Infiniband stack verbs to the adapter device driver and then finally to a host channel adapter.

SUMMARY

According to one embodiment of the present invention, a computer implemented method, a computer program product, and a data processing system are provided for processing STREAMS messages over an Infiniband system area network. STREAMS message received at a STREAMS over Infiniband module from a STREAMS based application are encapsulated in Infiniband verbs to create an encapsulated STREAMS message. A STREAMS identifier header is appended onto the Infiniband verb. The STREAMS over Infiniband module forwards the encapsulated STREAMS message to a streams interface layer where the encapsulated STREAMS message is then forwarded to a host channel adapter of the Infiniband system area network.

BRIEF DESCRIPTION OF THE SEVERAL VIEWS OF THE DRAWINGS

FIG. 3A is a diagram of a host channel adapter in accordance with an illustrative embodiment;

DETAILED DESCRIPTION

Figure 1:
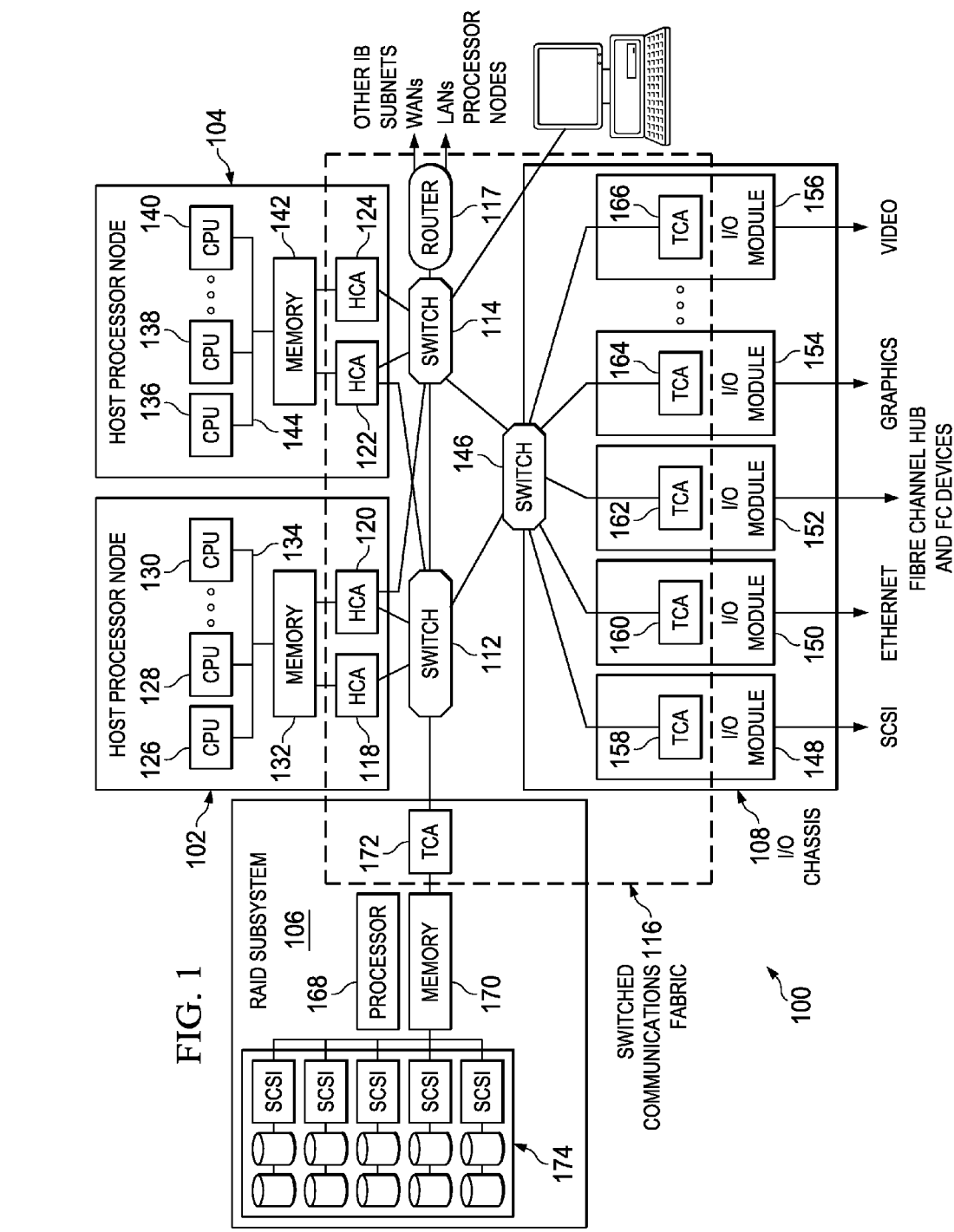
FIG. 1 is a diagram of a distributed computer system in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram of a distributed computer system in accordance with an illustrative embodiment. The distributed computer system represented in FIG. 1 takes the form of a system area network (SAN) and is provided merely for illustrative purposes, and can be implemented on computer systems of numerous other types and configurations. For example, computer systems implementing the illustrative embodiment can range from a small server with one processor and a few input/output (I/O) adapters to massively parallel supercomputer systems with hundreds or thousands of processors and thousands of I/O adapters. Furthermore, the illustrative embodiment can be implemented in an infrastructure of remote computer systems connected by an Internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an end node, which is herein defined to be a device that originates or finally consumes messages or frames in SAN 100.

In one embodiment, an error-handling mechanism in distributed computer systems is present in which the error-handling mechanism allows for reliable connection or reliable datagram communication between end nodes in a distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN 100. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. SAN 100, shown in FIG. 1, includes switched communications fabric 116, which allows many devices to concurrently transfer data with high-bandwidth and low latency in a secure remotely managed environment. End nodes can communicate over multiple ports and utilize multiple paths through the SAN fabric. The multiple ports and paths through SAN 100 can be employed for fault tolerance and increased bandwidth data transfers.

SAN 100 includes switch 112, switch 114, switch 146, and router 117. A switch is a device that connects multiple links together and allows routing of packets from one link to another link within a subnet using a small header destination local identifier (DLID) field. A router is a device that connects multiple subnets together and is capable of routing frames from one link in a first subnet to another link in a second subnet using a large header destination globally unique identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along from the source to the destination. Except for the variant CRC trailer field, which is updated at each stage in the network, switches pass the packets along unmodified. Routers update the variant CRC trailer field and modify other fields in the header as the packet is routed.

SAN 100, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on switched communications fabric 116. Host processor node 102 contains channel adapters in the form of host channel adapter 118 and host channel adapter 120. Host processor node 104 contains host channel adapter 122 and host channel adapter 124. Host processor node 102 also includes central processing unit 126, central processing unit 128, central processing unit 130, and memory 132 interconnected by bus system 134. Host processor node 104 similarly includes central processing unit 136, central processing unit 138, and memory 142 interconnected by bus system 144. Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 provide the I/O and interprocessor communications (IPC) consumers of the distributed computer system with zero processor-copy data transfers without involving the operating system kernel process and employs hardware to provide reliable fault-tolerant communications.

As indicated in FIG. 1, router 117 is coupled to wide area network (WAN) and/or local area network (LAN) connections to other hosts or other routers. I/O chassis 108 includes switch 146 and multiple I/O modules 148-156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158-166.

In this example, RAID subsystem node 106 includes processor 168, memory 170, target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 allows I/O adapter nodes to communicate among themselves or communicate with any or all of the processor nodes in a distributed computer system. With an I/O adapter attached to SAN 100, the resulting I/O adapter node has substantially the same communication capability as any host processor node in SAN 100.

In one embodiment, SAN 100 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example, I/O operation of the distributed computer system shown in FIG. 1, a host processor node, such as host processor node 102 initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system, shown in FIG. 1, performs operations that employ virtual addresses and virtual memory protection mechanisms to ensure correct and proper access to all memory. Applications running in such a distributed computed system are not required to use physical addressing for any operations.

Figure 2:
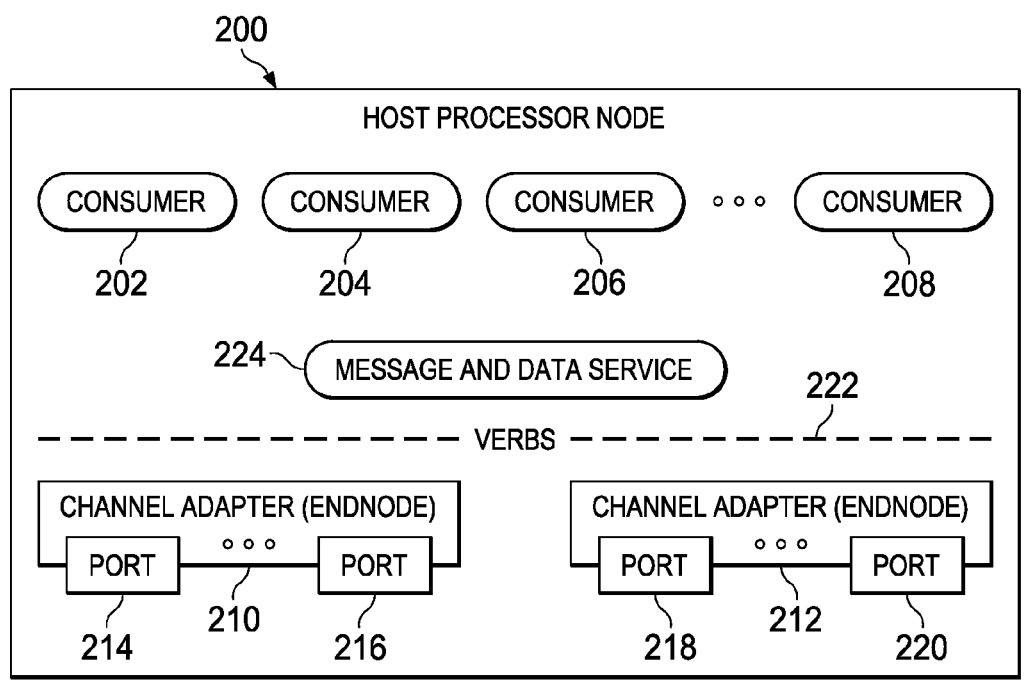
FIG. 2 is a functional block diagram of a host processor node in accordance with an illustrative embodiment.

Turning next to FIG. 2, a functional block diagram of a host processor node is depicted in accordance with an illustrative embodiment. Host processor node 200 is an example of a host processor node, such as host processor node 102 in FIG. 1. In this example, host processor node 200 includes set of consumers 202-208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Additionally, host processor node 200 includes message and data service 224, which is a higher-level interface than the verb layer and is used to process messages and data received through channel adapter 210 and channel adapter 212. Message and data service 224 provides an interface to consumers 202-208 to process messages and other data. Consumers 202-208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host.

With reference now to FIG. 3A, a diagram of a host channel adapter is depicted in accordance with an illustrative embodiment. Host channel adapter 300A includes set of queue pairs (QPs) 302A-310A which are used to transfer messages to host channel adapter ports 312A-316A. Buffering of data to host channel adapter ports 312A-316A is channeled through virtual lanes (VL) 318A-334A where each VL has its own flow control. Subnet manager configures channel adapters with the local addresses for each physical port, i.e., the port's LID. Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 341A with respect to queue pairs 302A-310A.

A single channel adapter, such as host channel adapter 300A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating system-specific programming interface, which is herein referred to as verbs, to place work requests (WRs) onto a work queue.

Figure 3B:
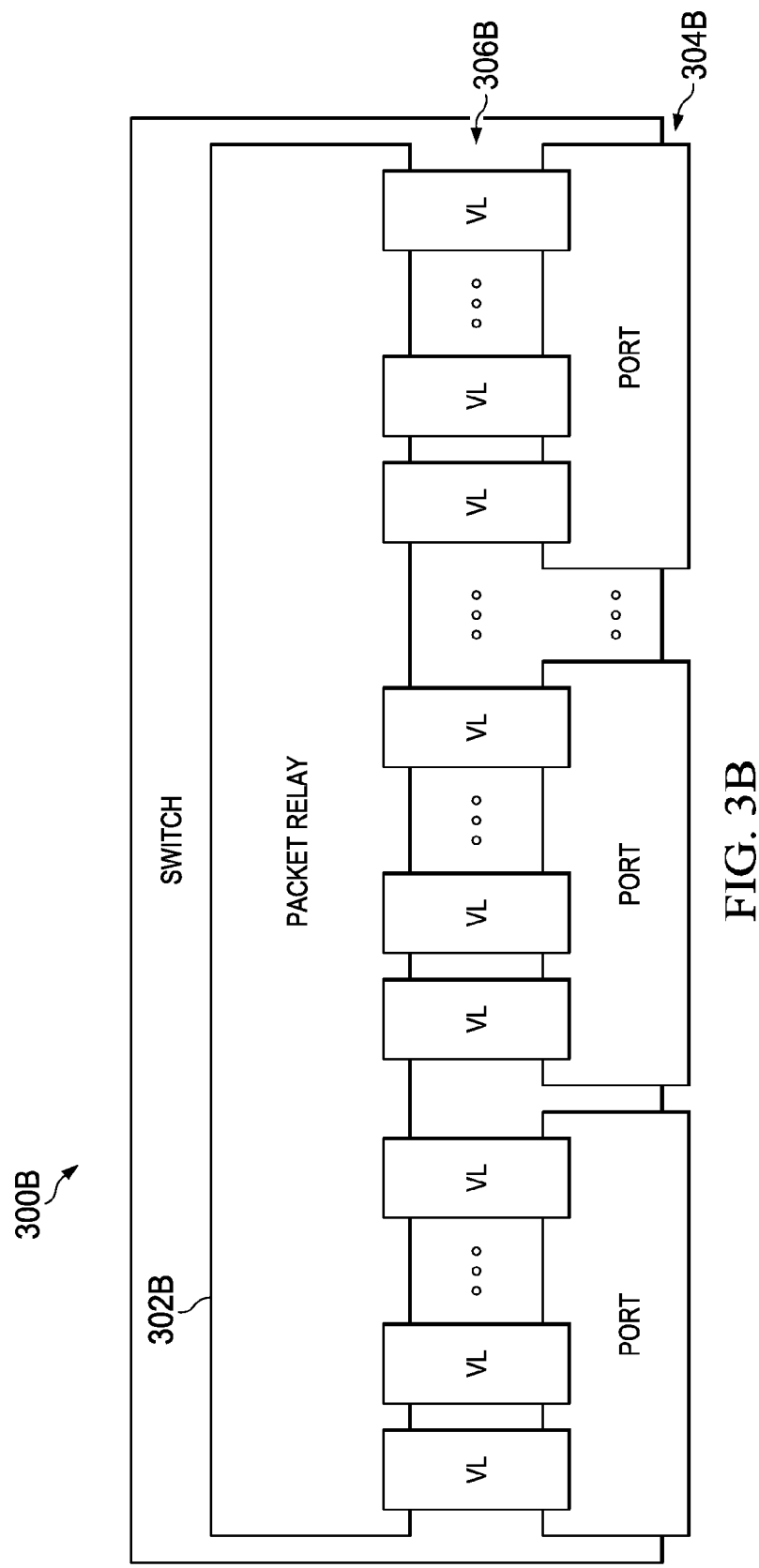
FIG. 3B depicts a switch in accordance with an illustrative embodiment.

FIG. 3B depicts a switch in accordance with an illustrative embodiment. Switch 300B includes packet relay 302B in communication with number of ports 304B through virtual lanes, such as virtual lane 306B. Generally, a switch, such as switch 300B can route packets from one port to any other port on the same switch.

Figure 3C:
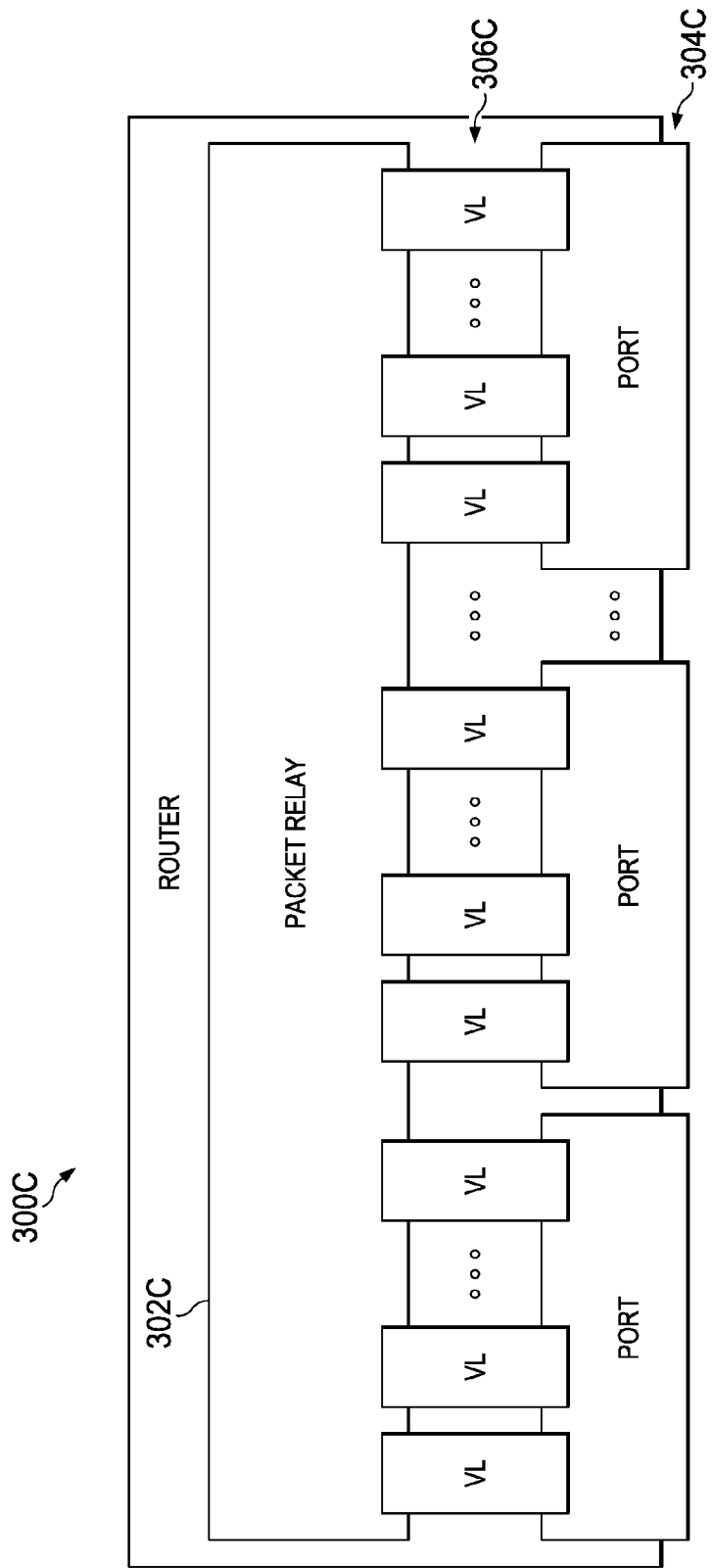
FIG. 3C depicts a router in accordance with an illustrative embodiment.

FIG. 3C depicts a router in accordance with an illustrative embodiment. Router 300C includes packet relay 302C in communication with number of ports 304C through virtual lanes, such as virtual lane 306C. Like switch 300B of FIG. 3B, router 300C will generally be able to route packets from one port to any other port on the same router.

Channel adapters, switches, and routers employ multiple virtual lanes within a single physical link. As illustrated in FIGS. 3A-3C, physical ports connect end nodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks the physical link due to contention, quality of service (QoS), or other considerations, a packet on a different virtual lane is allowed to make progress. Virtual lanes are employed for numerous reasons, some of which are as follows: virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured the loops will not cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
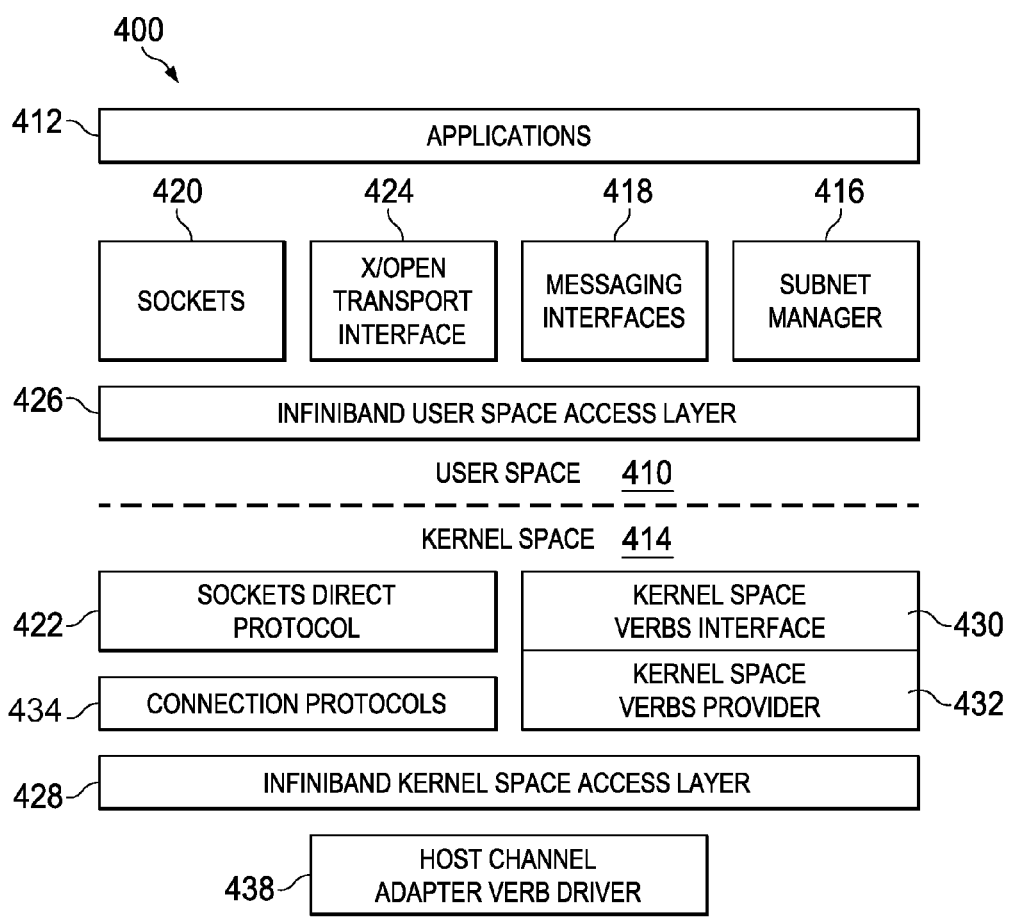
FIG. 4 is a high level overview of a software architecture for a system area network in accordance with an illustrative embodiment.

Referring now to FIG. 4, a high level overview of a software architecture for a system area network is depicted in accordance with an illustrative embodiment. Software architecture 400 can be, for example, an Infiniband Software architecture, implemented on a system area network, such as SAN 100 of FIG. 1.

Software architecture 400 is divided into user space 410 and kernel space 414. User space 410 is a segregated portion of virtual memory that is reserved for software applications and processes, such as applications 412.

Applications 412 are computer software utilizing user space 410. Applications 412 are designed to help the user to perform specific tasks. Applications 410 can include, for example, but are not limited to, office suites, graphics software, and media players. In one illustrative embodiment, applications 412 can be a STREAMS based application.

Subnet manager 416 is a software component that actively manages all the operational characteristics of the fabric, such as, for example, but not limited to, initialization, switch programming, addressing, and routing. The assignment of the destination local identifier and the globally unique identifier is done by the subnet manager.

Messaging interfaces 418 are user-space implementations that can be built using a user-space access interface. Messaging interfaces 418 can be a set of one or more interfaces, including, but not limited to, message parsing interface (MPI), and virtual interface provider library (VIPL).

Sockets 420 are data communications endpoints for exchanging data between processes executing within the same host operating system. Sockets 420 can, for example, utilize sockets direct protocol (SDP) 422. Sockets direct protocol 422 is a communications protocol that provides remote direct memory access in a manner which is transparent to applications 412.

X/Open transport interface 424 (XTI) is a transport layer application interface that defines an independent transport-service interface for network applications. X/Open transport interface 424 is independent of any transport provider.

Infiniband user space access layer 426 and Infiniband kernel space access layer 428 are coordinating software components that export underlying capabilities of a host channel adapter to applications 412. These capabilities can include, but are not limited to, managing of host channel adapter resource usage, management queue access, kernel translations, and processing of requests in work queues.

Kernel space verbs interface 430 is a software component that enables direct user space access to Infiniband hardware through the use of verbs. Kernel space verbs interface 430 is essentially an abstract description of the functionality of a host channel adapter. Together with messaging interfaces 418, kernel space verbs interface 430 allows for the transfer of messages to a system area network. Kernel space verbs provider 432 is a software component that allows for user mode input/output to bypass the operating system for data transfer operations.

Connection protocols 434 are other digital message formats and rules for exchanging those messages that can be utilized by software architecture 400 for exchanging messages. Connection protocols 434 can include, for example, but are not limited to, internet protocol over Infiniband (IpoIB) and small computer system interface remote direct memory access (SCSI RDMA) (SRP). Host channel adapter verb driver 438 is software capable of implementing verbs on the host channel adapter.

Figure 5:
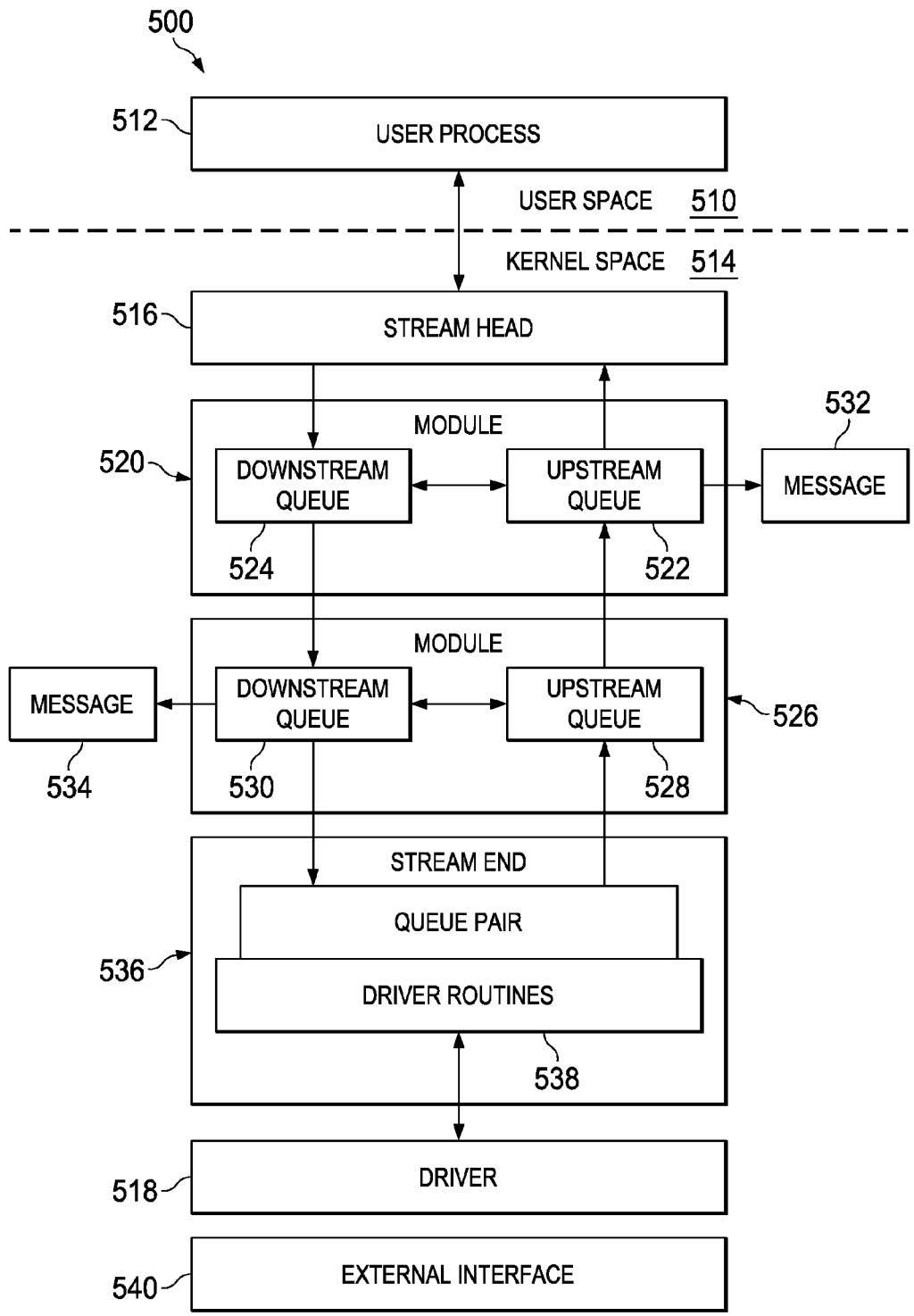
FIG. 5 is a high level overview of a STREAMS architecture in accordance with an illustrative embodiment.

Referring now to FIG. 5, a high level overview of a STREAMS architecture is depicted in accordance with an illustrative embodiment. Data processing system 500 is a system area network, such as system area network 100 of FIG. 1.

User space 510 is a segregated portion of virtual memory that is reserved for software applications and processes executing on data processing system 500. User process 512 is a process utilizing user space 510. User process 512 can be applications 412 of FIG. 4.

Kernel space 514 is a segregated portion of virtual memory that is reserved for running the kernel, kernel extensions, and most device drivers.

Stream head 516 transfers data between user space 510 of user process 512 and kernel space 514. Data sent to driver 518 from user process 512 is packaged into STREAMS messages and transmitted downstream. Downstream messages arriving at stream head 516 are processed by stream head 516, and data is copied from user buffers. STREAMS can insert one or more modules into a stream between the stream head and the driver to process data passing between the two.

Stream head 516 is an interface between the stream and an application program. Stream head 516 processes STREAMS-related operations from user process 512 and performs the bidirectional transfer of data and information between user process 512 in user space 510 and STREAMS messages in kernel space 514.

Stream head 516 passes messages downstream to module 520 by directly accessing downstream queue 524 in the direction of message flow. Module 520 performs intermediate transformations on messages passing between stream head 516 and the driver. Zero or more modules, such as module 520 can exist in a stream.

Messages are the means of transferring data and communicating within a stream. A STREAMS message contains data, status or control information, or a combination of both. Each message includes a specified message type indicator that identifies the contents.

Module 520 includes a pair of queue structures to implement the bidirectional and symmetrical attributes of a stream: upstream queue 522 and downstream queue 524. Upstream queue 522 performs functions on messages passing upstream through module 520. Downstream queue 524 performs another set of functions on messages passing downstream through module 520.

Each of upstream queue 522 and downstream queue 524 can have distinct functions that are unrelated to processing procedures and data utilized by the other. That is, upstream queue 522 can have distinct functions that are unrelated to processing procedures and data of downstream queue 524. Downstream queue 524 can have distinct functions that are unrelated to processing procedures and data of upstream queue 522.

Downstream queue 524 can directly access the adjacent downstream queue 530 of module 526 in the direction of message flow. Upstream queue 522 can directly access the adjacent stream head 516 in the direction of message flow. In addition, within a module, a QUEUE can readily locate its mate and access its messages, for example for echoing and data. Generally, each of upstream queue 522 and downstream queue 524 has a distinct set of messages, processing procedures, and data.

Upstream queue 522 includes message 532. Message 532 is the means of transferring data and communicating within a stream. A STREAMS message, such a message 532 contains data, status or control information, or a combination thereof. Each message, such a message 532 includes a specified message type indicator that identifies the contents of the message. Message 532 is dynamically attached to upstream queue 522 as message 532 passes through module 520.

Downstream queue 530 includes message 534. Message 534 is a message similar to message 532. Message 534 is dynamically attached to downstream queue 530 as message 534 passes through module 526.

According to their function, processing procedures for each of each of upstream queue 522, downstream queue 524, upstream queue 528, and downstream queue 530 can send messages upstream or downstream. Each of upstream queue 522, downstream queue 524, upstream queue 528, and downstream queue 530 incorporates a put procedure in the queue to process messages. Optionally, each of upstream queue 522, downstream queue 524, upstream queue 528, and downstream queue 530 can also incorporate a service procedure for sharing the message processing with the put procedure. According to their function, processing procedures for each of upstream queue 522, downstream queue 524, upstream queue 528, and downstream queue 530 can also modify the private data in their module.

Data within each of upstream queue 522, downstream queue 524, upstream queue 528, and downstream queue 530 is data required by the queues to perform message processing. The data can include, for example, but not limited to, state information and translation tables. Developers can provide private data if required by the QUEUE to perform message processing.

Stream end 536 is a module, such as one of modules 520 and 526, in which the module processing procedures are driver routines 538. The procedures in the stream end are different from those in other modules because they are accessible from an external device and because the STREAMS mechanism allows multiple streams to be connected to driver 518. Driver 518 can be an internal pseudo-device driver. A pseudo-device driver is not directly related to any external device, and it performs functions internal to the kernel.

Alternatively, driver 518 can be a device driver providing an interface between kernel space 514 and an external communications device through external interface 540. Device drivers must transform all data and status or control information between STREAMS message formats and their external representation.

Figures 6, 7:
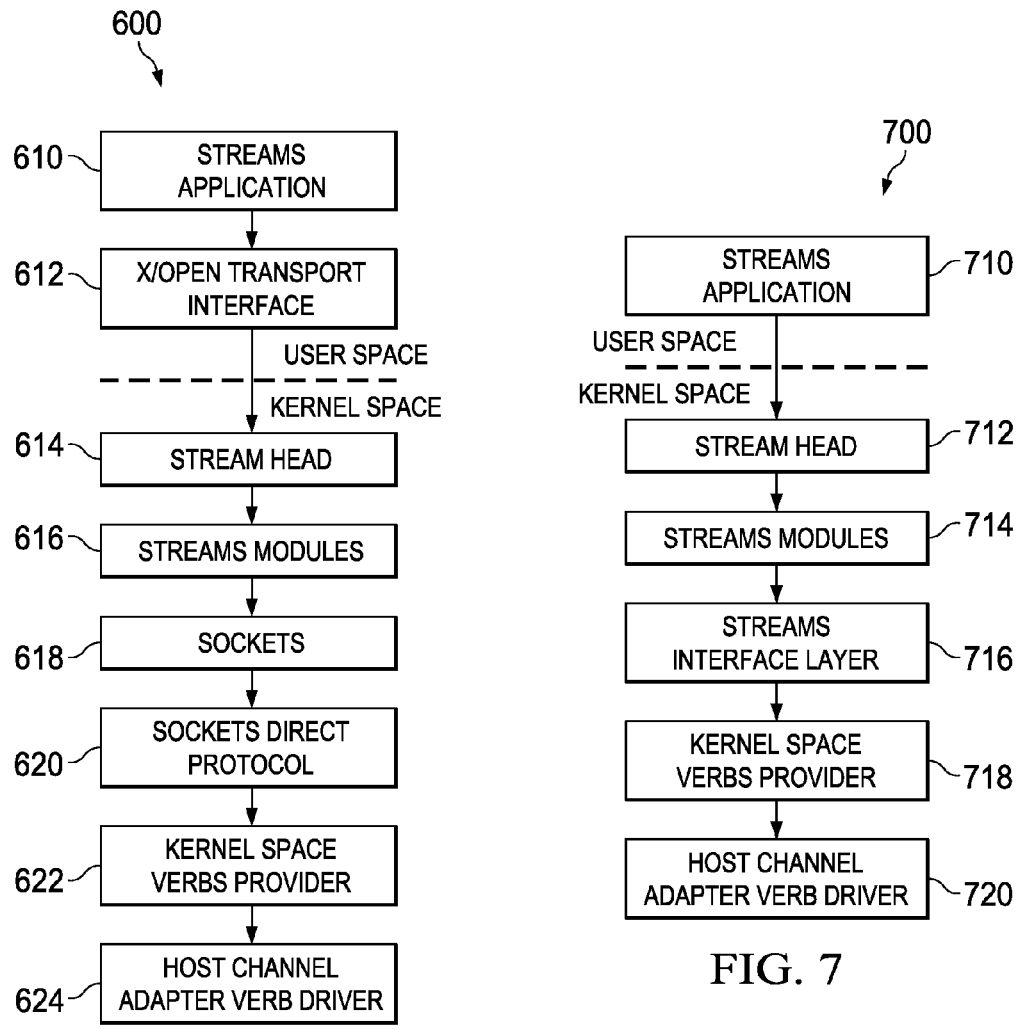
FIG. 6 is a high level software architecture showing a data flow for passing STREAMS data over a system area network according to the prior art.
FIG. 7 is a high level software architecture showing a data flow for passing STREAMS data over a system area network in accordance with an illustrative embodiment.

Referring now to FIG. 6, a high level software architecture showing a data flow for passing STREAMS data over a system area network is depicted according to the prior art. System area network 600 can pass STREAMS messages through a STREAMS module, such as shown in FIG. 5 over a system area network having Infiniband architecture, such as shown in FIG. 4.

STREAMS application 610 is applications 412 of FIG. 4. To communicate over system area network 600, such as an Infiniband (IB) network, STREAMS application 610 passes STREAMS messages from STREAMS application 610 to X/Open transport interface 612. X/Open transport interface 612 is X/Open transport interface 424 of FIG. 4. X/Open transport interface 612 is then able to access stream head 614.

Stream head 614 is stream head 516 of FIG. 5. Stream head 614 passes STREAMS data to STREAMS modules 616. STREAMS modules 616 can be, for example, module 520 of FIG. 5. STREAMS modules 616 performs intermediate transformations on STREAMS messages passing from stream head 614. STREAMS modules 616 can be zero or more modules.

In one illustrative embodiment, STREAMS modules 616 include a transport interface (TI) X/Open transport interface (XTI) over sockets STREAMS module (TIMOD). The transport interface STREAMS module converts a set of STREAMS input/output operations into STREAMS messages that may be consumed by a transport protocol provider that supports the transport interface. This conversion allows a user to initiate certain transport interface functions as atomic operations.

In one illustrative embodiment, STREAMS modules 616 include a X/Open transport interface (XTI) over sockets transport interface over sockets STREAMS module (XTISO). The X/Open transport interface over sockets STREAMS module is a pseudo-driver that acts as the transport provider for socket-based communications. It interprets back and forth between the TPI messages it receives from upstream and the socket interface.

Sockets 618 are kernel space sockets that communicate with sockets 420 of FIG. 4. Sockets 618 pass STREAMS messages received from STREAMS modules 616 via sockets direct protocol 620 to kernel space verbs provider 622. Sockets direct protocol 620 is sockets direct protocol 422 of FIG. 4. Kernel space verbs provider 622 is kernel space verbs provider 432 of FIG. 4.

The illustrative embodiments described herein recognize that software stacks used for communication over system area networks (SAN), system area network 600, do not directly support STREAMS based applications. Instead, a complex and inefficient data flow involving multiple intermediate layers is required to pass data from a STREAMS based application over the Infiniband network and finally to a device driver. A transport layer application interface that is independent of any transport provider, such as X/Open Transport Interface is first used to pass data from the STREAMS based applications through XTI to a Sockets layer. Using an upper layer networking protocol having access to the Infiniband stack, such as sockets direct protocol (SDP), user space verbs provider 622 can then be passed from the sockets layer to Infiniband stack verbs. Only then can the Infiniband communication manager send STREAMS data from the Infiniband stack verbs to the adapter device driver and then finally to a host channel adapter.

The illustrative embodiments described herein provide a computer implemented method for processing STREAMS messages over an Infiniband system area network. STREAMS messages received at a STREAMS over Infiniband module from a STREAMS based application are encapsulated in Infiniband verbs to create an encapsulated STREAMS message. A STREAMS identifier header is appended onto the Infiniband verb. The STREAMS over Infiniband module forwards the encapsulated STREAMS message to a streams interface layer where the encapsulated STREAMS message is then forwarded to host channel adapter verb driver 624 of the Infiniband system area network. Host channel adapter verb driver 624 is host channel adapter verb driver 438 of FIG. 4. STREAMS messages can then be passed from host channel adapter verb driver 624 to the host channel adapter.

Referring now to FIG. 7, a high level software architecture showing a data flow for passing STREAMS data over a system area network is depicted in accordance with an illustrative embodiment. System area networks 700 can pass STREAMS messages through a STREAMS module, such as shown in FIG. 5 over a system area network having Infiniband architecture, such as shown in FIG. 4.

STREAMS application 710 is applications 412 of FIG. 4. To communicate over system area networks 700, such as an Infiniband (IB) network, STREAMS application 710 passes STREAMS messages from STREAMS application 710 to stream head 712.

Stream head 712 is stream head 516 of FIG. 5. Stream head 712 passes STREAMS messages to STREAMS modules 714. STREAMS modules 714 can be, for example, module 520 of FIG. 5. STREAMS modules 714 performs intermediate transformations on STREAMS messages passing from stream head 712. STREAMS modules 714 can be zero or more modules.

STREAMS modules 714 allocates one queue pair in the unreliable datagram on system area networks 700. STREAMS modules 714 ensures adequate buffer space is available within queues, such as upstream queues 522 and 528 of FIG. 5, and downstream queues, such as downstream queues 524 and 530 of FIG. 5.

When STREAMS modules 714 receives a STREAMS message on an upstream queue, STREAMS modules 714 encapsulates the STREAMS message in a verb. In one illustrative embodiment, the verb is a "post send request" verb. A "post send request" is a commonly used verb to request transmission of a message to another application.

Additionally, STREAMS modules 714 appends an additional header onto the verb. The additional header includes information identifying the stream sending the STREAMS message that is encapsulated in the verb.

When STREAMS modules 714 receives a STREAMS message on a downstream queue, STREAMS modules 714 examines the additional header on the verb to identify the stream sending the STREAMS message that is encapsulated in the verb. STREAMS modules 714 also removes the STREAMS message from the verb in which the STREAMS message is encapsulated.

STREAMS modules 714 passes STREAMS messages to streams interface layer 716. Streams interface layer 716 is a software component that maps STREAMS read services and STREAMS write services to system area network operations. STREAMS read services can be implemented as msg_get calls. STREAMS write services can be implemented as msg_put calls. Streams interface layer 716 interacts with kernel space verbs provider 718 to manage STREAMS connections. Kernel space verbs provider 718 is user space verbs provider 432 of FIG. 4.

Kernel space verbs provider 718 can then pass the STREAMS messages to host channel adapter verb driver 720. Host channel adapter verb driver 720 is host channel adapter verb driver 438 of FIG. 4. STREAMS messages can then be passed from host channel adapter verb driver 720 to the host channel adapter.

Figure 8:
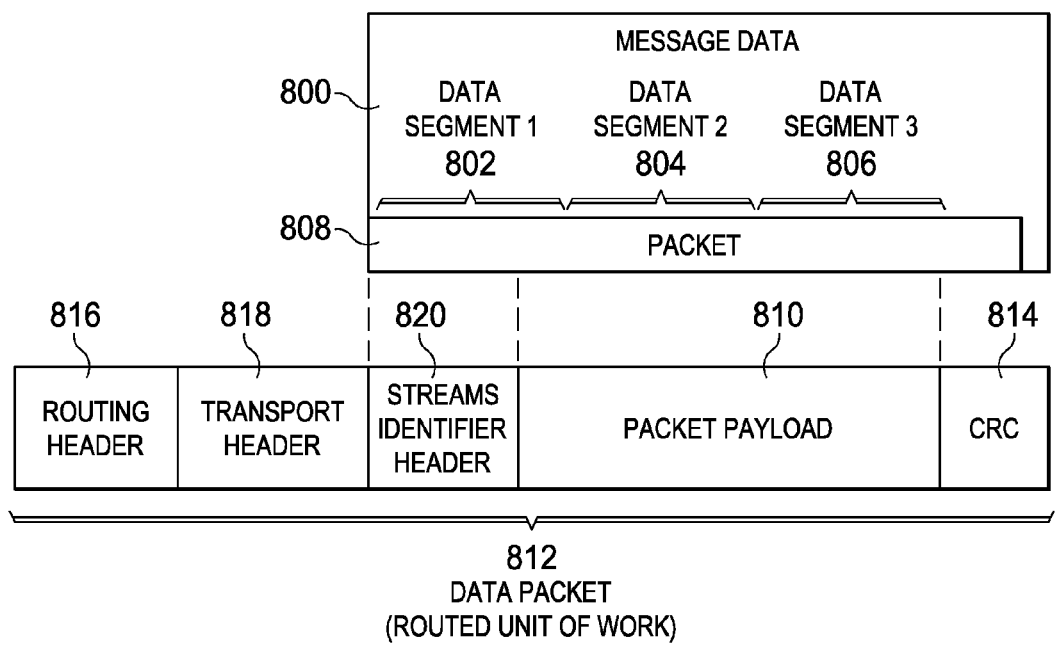
FIG. 8 is an illustration of a data packet in accordance with an illustrative embodiment.

Referring now to FIG. 8, an illustration of a data packet is depicted in accordance with an illustrative embodiment. A data packet is a unit of information that is routed through the SAN fabric. In one illustrative embodiment, the data packet is a verb for transport on an Infiniband fabric. The data packet is an end node-to-end node construct, and is thus created and consumed by end nodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 800 contains data segment 1 802, data segment 2 804, and data segment 3 806. In an illustrative embodiment, one or more of data segment 1 802, data segment 2 804, and data segment 3 806 is a STREAMS message for use by a STREAMS based application, such as STREAMS application 710 of FIG. 7. In this example, these data segments form packet 808, which is placed into packet payload 810 within data packet 812. In an illustrative embodiment, data packet 812 is a verb for transport on an Infiniband fabric. Additionally, data packet 812 contains CRC 814 which is used for error checking. Additionally, routing header 816 and transport header 818 are present in data packet 812. Routing header 816 is used to identify source and destination ports for data packet 812. Transport header 818, in this example, specifies the destination queue pair for data packet 812. Additionally, transport header 818 also provides information such as the operation code, packet sequence number, and partition for data packet 812.

Additionally, data packet 812 contains STREAMS identifier header 820. STREAMS identifier header 820 is an additional header identifying a stream sending a STREAMS message that is encapsulated in data packet 812. A STREAMS module, such as STREAMS modules 714 of FIG. 7, appends STREAMS identifier header 820 onto data packet 812.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an end node may be configured to be members of one or more possibly overlapping sets called partitions.

Figure 9:
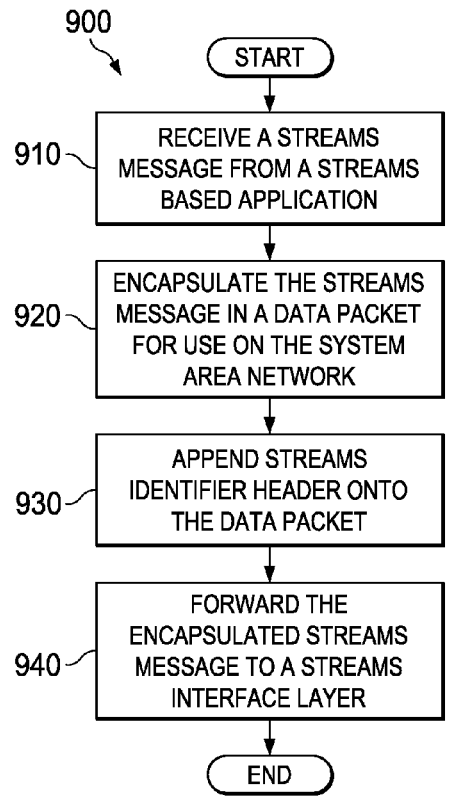
FIG. 9 is a flowchart of a process for processing downstream STREAMS messages over a system area network in accordance with an illustrative embodiment.

Referring now to FIG. 9, a flowchart of a process for processing downstream STREAMS messages over a system area network is depicted in accordance with an illustrative embodiment. Process 900 is a software process executing on a software component, such as STREAMS modules 714 of FIG. 7.

Process 900 begins by receiving a STREAMS message from a STREAMS based application (step 910). The STREAMS based application can be STREAMS application 710 of FIG. 7.

Responsive to receiving the STREAMS message, process 900 encapsulates the STREAMS message in a data packet for use on the system area network (step 920). The data packet can be data packet 812 of FIG. 8. In an illustrative embodiment, the data packet is a verb for transport on an Infiniband fabric.

Next, process 900 appends STREAMS identifier header onto the data packet (step 930). The STREAMS identifier header is an additional header identifying a stream sending a STREAMS message that is encapsulated in a data packet. The STREAMS identifier header is STREAMS identifier header 820 of FIG. 8.

Process 900 then forwards the encapsulated STREAMS message to a streams interface layer (step 940) with the process terminating thereafter. The streams interface layer is streams interface layer 716 of FIG. 7. The streams interface layer interacts with a user space verbs provider, such as kernel space verbs provider 718 of FIG. 7, to pass the encapsulated STREAMS message to a host channel access verb driver and then onto the host channel adapter.

Figure 10:
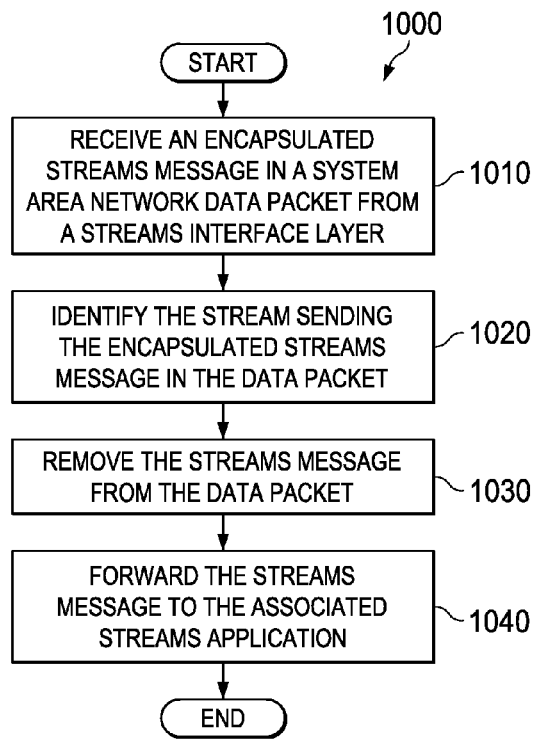
FIG. 10 is a flowchart for processing upstream STREAMS messages over an system area network in accordance with an illustrative embodiment.

Referring now to FIG. 10, a flowchart of a process for processing upstream STREAMS messages over a system area network is depicted in accordance with an illustrative embodiment. Process 1000 is a software process executing on a software component, such as STREAMS modules 714 of FIG. 7.

Process 1000 begins by receiving an encapsulated STREAMS message in a system area network data packet from a streams interface layer (step 1010). In an illustrative embodiment, the data packet is a verb for transport on an Infiniband fabric. The streams interface layer is streams interface layer 716 of FIG. 7.

Responsive to receiving the encapsulated STREAMS message, process 1000 identifies the stream sending the encapsulated STREAMS message in the data packet (step 1020). The stream sending the encapsulated STREAMS message can be identified from an additional STREAMS identifier header in the data packet. The STREAMS identifier header is STREAMS identifier header 820 of FIG. 8.

Process 1000 then removes the STREAMS message from the data packet (step 1030). Next, process 1000 forwards the STREAMS message to the associated STREAMS application (step 1040) with the process terminating thereafter. The STREAMS based application can be STREAMS application 710 of FIG. 7.

The illustrative embodiments described herein recognize that Software stacks used for communication over System Area Networks (SAN), System Area Network 600, do not directly support STREAMS based applications. Instead, a complex and inefficient data flow involving multiple intermediate layers is required to pass data from a Streams based application, over the Infiniband network, and finally to a device driver. A transport layer application interface that is independent of any transport provider, such as X/Open Transport Interface is first used to pass data from the STREAMS based applications through XTI to a Sockets layer. Using an upper layer networking protocol having access to the Infiniband stack, such as Sockets Direct Protocol (SDP), data can then be passed from the Sockets layer to Infiniband stack Verbs. Only then can the Infiniband Communication Manager send STREAMS data from the Infiniband stack Verbs to the Adapter Device Driver and then finally to Adapter.

Thus, the illustrative embodiments described herein provide computer implemented method for processing STREAMS messages over an Infiniband system area network. STREAMS message received at a STREAMS over Infiniband module from a STREAMS based application are encapsulated in Infiniband verbs to create an encapsulated STREAMS message. A STREAMS identifier header is appended onto the Infiniband verb. The STREAMS over Infiniband module forwards the encapsulated STREAMS message to a streams interface layer, where the encapsulated STREAMS message is then forwarded to a host channel adapter of the Infiniband system area network.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for sending STREAMS messages over a system area network, the method comprising:
    receiving a STREAMS message from a STREAMS based application;
    encapsulating the STREAMS message in a Post Send Request Infiniband verb for use on the system area network to create an encapsulated STREAMS message;
    appending a STREAMS identifier header onto the Post Send Request Infiniband verb;
    forwarding the encapsulated STREAMS message to a streams interface layer; and
    forwarding the encapsulated STREAMS message to a host channel adapter of the system area network.
    wherein the STREAMS message is not passed through either of a transport interface STREAMS module or a X/Open transport interface over sockets STREAMS module.

2. The computer implemented method of claim 1, wherein the system area network is an Infiniband network.

3. The computer implemented method of claim 1, wherein the STREAMS identifier header includes information identifying a stream of the STREAMS based application sending the STREAMS message that is encapsulated in the Post Send Request Infiniband verb.

4. A computer implemented method for receiving STREAMS messages over a system area network, the method comprising:
    receiving a Post Send Request Infiniband verb containing an encapsulated STREAMS message from a host channel adapter of the system area network;
    identifying a STREAMS identifier header from the Post Send Request Infiniband verb;
    removing the encapsulating STREAMS message from the packet Post Send Request Infiniband verb to create a STREAMS message; and forwarding the STREAMS message to an associated STREAMS application;
    wherein the STREAMS message is not passed through either of a Transport Interface STREAMS module or a X/Open Transport Interfac over Sockets STREAMS module.

5. The computer implemented method of claim 4, wherein the system area network is an Infiniband network.

6. The computer implemented method of claim 4, wherein the STREAMS identifier header includes information identifying a stream of the STREAMS based application sending the STREAMS message that is encapsulated in the Post Send Request Infiniband verb.

7. A computer program method for processing a STREAMS messages over a system area network, the method comprising:
    a computer usable storage media having computer usable instructions encoded thereon, wherein the computer usable instructions comprise:
    instructions for receiving a STREAMS message from a STREAMS based application;
    instructions for encapsulating the STREAMS message in a Post Send Request Infiniband verb for use on the system area network to create an encapsulated STREAMS message;
    instructions for appending a STREAMS identifier header onto the Post Send Request Infiniband verb;
    instructions for forwarding the encapsulated STREAMS message to a streams interface layer; and
    instructions for forwarding the encapsulated STREAMS message to a host channel adapter of the system area network;
    wherein the STREAMS message is not passed through either of a Transport Interface STREAMS module or a X/Open Transport Interface over Sockets STREAMS module.

8. The computer implemented method of claim 7, wherein the system area network is an Infiniband network.

9. The computer implemented method of claim 8, wherein the STREAMS identifier header includes information identifying a stream of the STREAMS based application sending the STREAMS message that is encapsulated in the Post Send Request Infiniband verb.

10. The computer implemented method of claim 7, the computer program product further comprising:

receiving a second Post Send Request Infiniband verb containing a second encapsulated STREAMS message from a the host channel adapter of the system area network;

identifying a second STREAMS identifier header from the second Post Send Request Infiniband verb;

removing the second encapsulated STREAMS message from the second Post Send Request Infiniband verb to create an a second STREAMS message; and forwarding the second STREAMS message to an associated second STREAMS application.

\* \* \* \* \*